United States Patent [19]

Chen

[11] Patent Number: 4,524,008

[45] Date of Patent: Jun. 18, 1985

[54] CONTROLLED INITIATION CHROMIUM DIOXIDE SYNTHESIS

[75] Inventor: Horng-Yih Chen, Chadds Ford, Pa.

[73] Assignee: E. I. Du Pont de Nemours and Company, Wilmington, Del.

[21] Appl. No.: 564,012

[22] Filed: Dec. 16, 1983

[51] Int. Cl.$^3$ .......................................... C01G 37/027
[52] U.S. Cl. ................................ 252/62.56; 252/62.51
[58] Field of Search .......................... 252/62.51, 62.56

[56] References Cited

U.S. PATENT DOCUMENTS

| 3,278,263 | 10/1966 | Cox | 252/62.51 |
| 3,600,315 | 8/1971 | Haines | 252/62.51 |
| 3,778,373 | 12/1973 | Robbins | 252/62.51 |

FOREIGN PATENT DOCUMENTS

| 749111 | 4/1970 | Belgium | 252/62.51 |
| 38-26652 | 12/1963 | Japan | 252/62.51 |

OTHER PUBLICATIONS

Kubota et al., "J. of the Amer. Ceram. Soc.", vol. 46, No. 11, 1963, pp. 550–556.

Primary Examiner—Jack Cooper

[57] ABSTRACT

Modified chromium dioxide crystals with narrower particle size and more uniform coercivity are produced by adding the modifying agent in an aqueous $CrO_3$ solution. Antimony, tellurium and iron oxides may be dissolved in a saturated $CrO_3$-water solution and added to the reaction mixture paste to yield improved crystals upon synthesis.

7 Claims, No Drawings

CONTROLLED INITIATION CHROMIUM DIOXIDE SYNTHESIS

FIELD OF THE INVENTION

This invention relates to the synthesis of ferromagnetic chromium dioxide in the presence of a modifying agent. In particular it relates to adding a modifying agent such as antimony or tellurium as a solution. Because this method involves the initial formation of chromium dioxide crystals, it is appropriate to refer to the process as per the title, i.e., controlled initiation chromium dioxide synthesis.

BACKGROUND OF THE INVENTION

The acicular crystal shape of ferromagnetic chromium dioxide can be improved when the reaction mixture used for synthesis contains certain modifying agents or nucleating compounds. Numerous U.S. Patents teach this nucleating or modification technique including: antimony, U.S. Pat. No. 2,923,683; iron, U.S. Pat. No. 3,034,988; ruthenium, U.S. Pat. No. 2,885,365; alkali metals, U.S. Pat. No. 2,923,685; phosphorous, U.S. Pat. No. 3,811,942; tin, U.S. Pat. No. 2,923,684; and tellurium, U.S. Pat. No. 3,243,260. A more recent disclosure in U.S. Pat. No. 4,340,494 describes the use of fine grained antimony oxide with senarmontite crystal structure as the modifying or nucleating agent for chromium dioxide synthesis.

As a result of this prior art it is known to employ solid additions of various metals, nonmetals and oxides during chromium dioxide synthesis. Included in the solid additions to the reaction mixture in the aforementioned U.S. Pat. No. 2,923,683 are antimony metal, $Sb_2O_3$, $SbF_3$, $SbCl_2$, and a mixed chromium/antimony oxide prepared by heating $CrO_3$ and $Sb_2O_3$ in an 8:1 molar ratio at 400° C. and 750 atmosphere pressure for 3 hours.

While the mechanism of chromium dioxide synthesis and the effect of modifying or nucleating agents is not known with certainty, it is known that water included in the reaction mixture is a necessary reactant at the 100 to 700 bar pressures and 200°–600° C. temperatures typical for chromium dioxide synthesis. However, due to the limited solubility of the modifying agents it was impractical to add them as solutions since such an excessive amount of water would be detrimental to the synthesis reaction.

Thus, prior to the present invention the focus of effort in the field of chromium dioxide synthesis was directed towards solid additions of modifiers.

It is an object of the present invention to provide a process for manufacture of an improved modified ferromagnetic chromium dioxide for use in recording elements wherein the magnetic properties are superior to those of modified ferromagnetic chromium dioxide produced by prior art methods.

SUMMARY OF THE INVENTION

The present invention provides a method of manufacture of modified ferromagnetic chromium dioxide wherein a reaction mixture containing trivalent and hexavalent chromium oxides is hydrothermally reacted under a pressure of from 100 to 700 bar at a temperature of 200°–600° C. in the presence of a modifier such as antimony, iron, or tellurium, characterized in that the modifier is added to the reaction mixture in the form of an aqueous solution prior to the application of heat and pressure. The aqueous solution is prepared by adding the modifier to a $CrO_3$-water solution and heating to effect dissolution.

In particular, the incorporation of from 0.1 to 0.5% by weight based upon the resulting modified chromium dioxide of antimony oxide or tellurium oxide dissolved in a $CrO_3$ solution in a reaction mixture allows the production of modified ferromagnetic chromium dioxide with narrower coercivity and particle size distribution and improved signal to noise ratio.

It is within the purview of the present invention to similarly dissolve iron oxide and other suitable chromium dioxide reaction mixture ingredients.

DETAILED DESCRIPTION OF THE INVENTION

The original discovery of ferromagnetic chromium dioxide by Arthur, U.S. Pat. No. 2,956,955, revealed the novel acicular or needle shape for the crystals which allowed them to be oriented in a magnetic element. But it was the subsequent discoveries of the aforementioned modifiers which allowed the production of superior acicular or needle shaped crystals. While the Arthur patent defines crystals with an aspect ratio of up to 6:1, the patents on modified chromium dioxide detail aspect ratios as high as 20:1.

Besides the acicular shape, the particle size of the chromium dioxide crystals plays an important role in determining the magnetic properties suitable for use in a magnetic element. While Arthur describes 1 to 10 micron particles, U.S. Pat. No. 4,340,494 describes improved smaller sized particles of 0.1 to 2 microns produced by solid additions of senarmontite antimony oxide and gamma-$Fe_2O_3$.

The art of ferromagnetic chromium dioxide synthesis thus involves the control of two important parameters, i.e., the aspect ratio and the particle size or surface area. As a means to attempt to gain some understanding of the interrelationship of important parameters the following derived equations can be useful.

For a chromium dioxide crystal with an aspect ratio, R, and cross-section, $a^2$, one can derive the following expressions:

$$\text{Surface area } A = (4R+2)a^2 \quad (1)$$

$$\text{Volume } V = a^3 R \quad (2)$$

and $$\text{Specific Surface Area } SSA = A/V = (4R+2)/4.89aR \quad (3)$$

where 4.89 g/cm$^3$ is the density of $CrO_2$. In the case $4R >> 2$, which is a good approximation for $CrO_2$ where the aspect ratio is typically 10 or greater, SSA becomes inversely proportional to a, thus giving:

$$SSA = 0.86/a \quad (4)$$

$$V = 0.64R/(SSA)^3 \quad (5)$$

and $$1/V = \text{number of particles per unit volume} = 1.56(SSA)^3/R \quad (6)$$

Equations (4) and (6) are of particular importance for an understanding of these parameters. Equation (4) implies that specific surface area (SSA) depends only on the cross-section of the crystal and is independent of the crystal aspect ratio. Equation (6) implies that for a given SSA value the number of particles is inversely proportional to the aspect ratio. It appears, therefore, that the two parameters SSA and R are not mutually related.

Antimony oxide is known to be effective in controlling the growth of chromium dioxide crystals. However, in practicing the prior art method of adding solid antimony oxide particles to the high viscosity paste mixture, the particles have limited mobility and are distributed in discrete and nonuniform locations. In other words, there is an overpopulation of antimony oxide in the immediate vicinity of the $Sb_2O_3$ particles and an antimony oxide deficiency in between the $Sb_2O_3$ particles. If, for example, the average particle size of the antimony oxide is $0.6\mu$ (which would represent an $SSA = 2.0$ $m^2/g$) and $0.18\%$ by weight is present, based upon the final weight of chromium dioxide, then the average separation between two particles is $7.2\mu$. The net effect of such a discrete distribution of the antimony oxide in the paste is that chromium dioxide formed in the immediate vicinity of a $Sb_2O_3$ particle is more acicular and of smaller particle size than that of the chromium dioxide formed in the inbetween region. The spread in the distribution of particle size and shape can lead to poor performance when these prior art chromium dioxide particles are incorporated in tapes or disks.

The present invention provides a practical means of control of the critical parameters involved in producing ferromagnetic chromium dioxide particles with superior crystal properties, i.e., properties, which correspond to improved magnetic performance. This approach of adding the crystal modifier or initiation agent as a solution can provide an ultimate uniform distribution prior to the start of the synthesis process. Added as a solution, the modifier or initiator can provide the maximum number of initiation or nucleation sites for the subsequent modification and growth of chromium dioxide crystals. In addition, the solution form provides the maximum dispersion of such initiation or nucleation sites with respect to the total reaction mass. Added as a solution, the modifier or initiator has maximum mobility with respect to the solid ingredients which make up the tar-like reaction mixture paste which will be subjected to elevated temperature and pressure during chromium dioxide synthesis.

In the production of antimony-modified chromium dioxide, it is believed that the chromium dioxide grows on $CrSbO_4$. By preferential growth along one axis, i.e., anisotropic growth, the desired acicular or needle crystals are produced. The coercivity of the chromium dioxide is further believed to be primarily related to how well this anisotropic growth proceeds as evidenced by the aspect ratio of the resulting crystals.

In the case of antimony modification, it was surprising result to find that solution addition produces chromium dioxide with physical and magnetic uniformity superior to that demonstrated in a comparison test in which 40 Å seed crystals of $CrSbO_4$ were added to the reaction mixture paste. Based upon theoretical growth parameters, one might reasonably have expected to obtain better results with the use of seed crystals than with a solution addition. The fact that the 40 Å $CrSbO_4$ crystals were inactive as nucleation agents leads to the conclusion that some in situ formation is required to provide the proper modification or nucleation reaction within the paste reaction mixture.

An amorphous form of $Sb_2O_3$ which was prepared by diluting a $Sb_2O_3$—$CrO_3$ solution was found to be ineffective as a chromium dioxide modifier or nucleating agent. The white precipitate, which had no definite x-ray diffraction pattern, contained less than 2% Cr and had a SSA of 26.9 $m^2/g$.

In general terms, the practice of the present invention provides a homogenous reaction mixture paste which is especially suited to undergo synthesis to produce modified chromium dioxide with improved magnetic properties. As an improvement over the prior art technique of paste preparation, the present invention provides simultaneous distribution of the hexavalent chromium and modifier or initiator throughout the highly viscous paste. An advance is provided by elimination of the previous heterogeneous and nonuniform nature of the reaction mixture paste. This improvement and advance has been confirmed via the observation of finer grain sized crystals with more uniform coercivities for identical compositions prepared by the present invention versus the prior art method of mixing the solid materials to form the paste.

These crystals may further be upgraded and stabilized, prior to being coated and oriented, by techniques well known in the art. A variety of known binders, surfactants, antistatic agents, plasticizers, hardeners, etc. can be employed in magnetic coating compositions. Pertinent prior art patents include U.S. Pat. Nos. 3,529,930; 3,512,930; 4,045,544; 3,080,319; 3,558,402; 3,468,700; 3,397,072; 3,585,141; 3,926,826; 3,929,658; 3,929,659; 3,278,263 and 3,649,541.

As stated above, suitable crystal modifiers or nucleating agents are known, but the solution process of the present invention provides a means to uniformly distribute them in the reaction mixture paste. For best results solutions of $Sb_2O_3$, $TeO_2$, and $Fe_2O_3$ should be dissolved in a hot, saturated water solution of $CrO_3$. When these modifier solutions are added to $Cr_2O_3$ to form the paste the complete distribution of the modifier therein provides uniform control of the synthesis process. However, a more dilute solution of $CrO_3$ can also be used, so long as it contains sufficient $CrO_3$ to achieve complete dissolution of the modifier in the solution beyond heating.

The controlled initiation synthesis of modified chromium dioxide according to the present invention provides even and uniform distribution of the modifier or nucleating agent within the reacting paste. Compared to the prior art, chromium dioxide crystals produced by this solution process have a narrower particle size distribution and shape and, when incorporated in a magnetic tape or disk, give improved performance, i.e., lower noise, better print-through, narrower coercivity distribution, and more uniform switching field distribution. These crystals are also useful in magnetic toning and printing operations.

The following Examples are illustrative; Example 2 represents the best mode contemplated by the inventor.

EXAMPLE 1

A solution was prepared by boiling 30 g of $Sb_2O_3$, 200 g $CrO_3$, and 120 g $H_2O$ at approximately 120° C. for 30 minutes.

In preparation for paste making $Cr_2O_3$ powder was sieved to provide a fine powder. This was mixed with 15 g of the antimony oxide solution and the following ingredients, in the given ratio and percentages, to prepare a paste containing 492 g $CrO_3$, 250 g $Cr_2O_3$, 185 g $H_2O$, and 2.85 g $\alpha$-$Fe_2O_3$: $1Cr_2O_3/2CrO_3/0.76$-$H_2O/0.18\%Sb_2O_3/0.4\%Fe_2O_3$ A composition of the same composition was prepared except that the required amount of $Sb_2O_3$ was added in the form of a solid. This mixture of solids in water served as a control.

Both the control paste and the paste prepared by solution addition according to the invention were each placed in an annular can as per Williston et al, U.S. Pat. No. 4,045,544, and reacted at 350° C. and 550 psi pressure.

Samples had the following powder properties.

|  | iHc | $\sigma s$ emg | $\sigma r$ emg | SSA · $m^2/g$ | Print-Through |
|---|---|---|---|---|---|
| Control | 521 | 81 | 39 | 27 | 0.68 volt |
| Invention | 575 | 80 | 40 | 36 | 0.48 volt |

These results show that the dissolved $Sb_2O_3$ was more effective than the same quantity of solid $Sb_2O_3$ in producing a high coercivity product with a higher surface area, representing a smaller particle size. The difference of 0.20 volt in the powder print-through data represents an improvement of 1.2 dB. This print-through represents a measure of the fraction of particles too small to remain stable magnetically.

EXAMPLE 2

An antimony oxide solution in chromic acid was prepared by heating to boil 4907 g $CrO_3$, 2944 g $H_2O$ and 868 g $Sb_2O_3$ and boiling the solution for one hour at 115°–120° under steady agitation. After cooling, the solution was used in its entirety as an additive in lieu of regular $Sb_2O_3$ powder, together with $Fe_2O_3$, to make paste for a 500 lb. chromium dioxide production. The same ratios and procedures were used as in Example 1.

After removal of the chromium dioxide and washing to remove any unreacted chromium compounds, both materials were separately upgraded and stabilized according to U.S. Pat. No. 3,529,930 and U.S. Pat. No. 3,512,930.

Audio tapes with a polyurethane binder of both the control and invention materials were prepared in duplicate, according to Ingersoll U.S. Pat. No. 3,649,541, Example 1, and their coercivity distributions were measured with a D.C. magnetometer. Table 1 contains a comparison of results for audio tests on the tapes.

TABLE 1

|  | Bias Noise | 10K Saturation | S/N 500 | Ratio 10K | RFR |
|---|---|---|---|---|---|
| Control 1 | 2.6 | −2.2 | −0.4 | −4.8 | −2.6 |
| Control 1 | 2.9 | −2.2 | −0.6 | −5.1 | −2.2 |
| Invention | 0 | 2.5 | 0 | 2.5 | 2.7 |
| Invention | −0.8 | 1.9 | 2.5 | 2.7 | 1.6 |

The improvement in saturated output, bias noise, and signal to noise ratio indicated in the table demonstrate the superior audio response of the chromium dioxide prepared according to the present invention as compared to chromium dioxide prepared by the prior art with the identical ingredients.

EXAMPLE 3

When the control and invention crystals of Example 2 were tested in a Beta-compatible video tape formulation a similar improvement in signal to noise ratio was observed.

EXAMPLE 4

When 1.95 g of $TeO_2$ was added to 385 g $CrO_3$ and 231 g $H_2O$ and boiled as in Example 1, a solution was obtained. A 562 g portion of the solution was used to make a paste with 202 g $CrO_3$, 210 g $Cr_2O_3$, and 28 g $\alpha$-$Fe_2O_3$. The paste had the formulation: $CrO_3/Cr_2O_3/H_2O/\%TeO_2/\%Fe_2O_3 = 2.63/1/1/0.25\%/4\%$. A control was made with the same formula except that $TeO_2$ was added as a solid powder. The chromium dioxide produced by this invention had a coercivity of 713 Oe compared with 710 Oe for the control. A more uniform size distribution was obtained with the solution process of the present invention.

EXAMPLE 5

30 g $\alpha$-$Fe_2O_3$ was dissolved in 300 g $CrO_3$ and 180 g $H_2O$ by boiling for 12 hours at 122° C. and added to a reaction paste. A control paste contained the same amount of iron oxide added as a solid. Synthesis was carried out as in Example 1 and the resulting crystal made with dissolved iron oxide exhibited a narrower range of magnetic coercivity than the control. Since iron oxide is not considered to function as a nucleating agent for crystal growth but only serves to increase coercivity, this illustrates that the practice of the present invention is sufficiently broad to encompass the solution addition of all modifiers and nucleating agents.

EXAMPLE 6

A solution was prepared by boiling for 3 hours at 118°; 500 g $CrO_3$, 300 g $H_2O$, and 100 g $\gamma$-$Fe_2O_3$. The dissolution was complete and this viscous solution was used to prepare chromium dioxide in lieu of the regular powder. Results similar to those of Example 5 were obtained.

We claim:

1. A process for the manufacture of modified ferromagentic chromium dioxide wherein a reaction mixture paste containing trivalent and hexavalent chromium oxides is hydrothermally reacted under a pressure of from 100 to 700 bar at a temperature of 200°–600° C. in the presence of an antimony, iron or tellurium modifier, characterized in that, the modifier is added in aqueous solution to the reaction mixture paste prior to the application of pressure and heat, said solution being prepared by adding the modifier to an aqueous $CrO_3$ solution and heating to effect dissolution and wherein the modified ferromagnetic chronium dioxide when incorporated into a magnetic tape exhibits lower noise, better print through, narrower coercivity distribution and more uniform switching field distribution than said modified ferromagnetic chromium dioxide produced as above but where the modifier is added in solid form to the reaction mixture paste.

2. The process of claim 1 in which the modifier increases acicular growth of the ferromagnetic chromium dioxide.

3. The process of claim 1 in which the modifier increases coercivity of the ferromagnetic chromium dioxide.

4. The process of claim 1 in which $Sb_2O_3$ is dissolved in aqueous $CrO_3$ solution at 90° to 120° C. over a period of from 45 to 180 minutes.

5. The process of claim 1 in which antimony or tellurium is present in an amount of 0.1 to 0.5% by weight, based upon the weight of the resulting ferromagnetic chromium dioxide.

6. The process of claim 1 in which tellurium is added to the aqueous $CrO_3$ solution in the form of tellurium oxide.

7. The process of claim 1 in which iron is added to the aqueous $CrO_3$ solution in the form of iron oxide.

* * * * *